United States Patent [19]

Wenning et al.

[11] Patent Number: 4,555,198

[45] Date of Patent: Nov. 26, 1985

[54] RUBBERIZED BALL ROD STUD FOR AUTOMOTIVE STEERING ASSEMBLY

[75] Inventors: Thomas J. Wenning, New Bremen; Charles E. Lynn, St. Marys, both of Ohio

[73] Assignee: The Goodyear Tire & Rubber Company, Akron, Ohio

[21] Appl. No.: 646,997

[22] Filed: Sep. 4, 1984

[51] Int. Cl.⁴ .............................................. F16C 11/00
[52] U.S. Cl. .................................... 403/130; 403/133
[58] Field of Search ............... 403/225, 226, 228, 130, 403/132, 133

[56] References Cited

U.S. PATENT DOCUMENTS 2,979,353  4/1961  Sellers, Jr. ........................ 29/441 X
4,235,558  11/1980  Snyder et al. .................. 403/137 X Primary Examiner—Andrew V. Kundrat
Attorney, Agent, or Firm—J. D. Wolfe; R. D. Thompson

[57] ABSTRACT

This invention provides a rubberized stud (10), preferably the molded configuration has a ball shape with a rubber height (28) to thickness (29) ratio of 2.0 to 3.0 and preferably 2.2 to 2.7 which can be compressed sufficiently to be inserted into a smaller diameter shaped socket to maintain the rubber under compression of 20 to 30% of its thickness and thereby produce a spring effect when the ball rod is rotated or twisted.

7 Claims, 3 Drawing Figures

RUBBERIZED BALL ROD STUD FOR AUTOMOTIVE STEERING ASSEMBLY

FIELD OF THE INVENTION

This invention relates to an improved rubberized stud for a vehicle steering assembly having a metallic ball on a end thereof covered with varying thickness of rubber of 60 to 70 durometer hardness to form thin sections and a thick section, said thick section having shape of a band having a width to thickness ratio of about 2.0 to 3.0 and preferably 2.2 to 2.7, and a curving surface to reduce stress concentration within the elastomer between the thinness sections and the wall of the band.

PRIOR ART

Generally, ball-joints have been found to exhibit unsatisfactory features for various reasons, for example they require too much servicing and lubrication, are short lived, are inefficient or are too costly. It is known to utilize synthetic elastomers or natural rubber in place of some of the metal in the usual ball and socket joint. Also, it is known to have the ball joint on a tapering or a straight wall shank member. Likewise, it is known to flatten the ball at the end opposite the shank to permit it to be supported by a load bearing member. Examples of ball modification and use of rubber in conjunction with the ball is illustrated in U.S. Pat. No. 4,235,558 and British Pat. No. 917,062, but these patents do not teach the use of specific dimensional ratios providing certain parameters that yield better service life or reduces the force required for manual steering or reduces vehicle drift.

A BRIEF SUMMARY OF THE INVENTION

In accordance with the present invention, there is provided a rubberized stud for use in a balljoint assembly for use in motor vehicles suspension steering linkages or the like. The assembly includes a stud member with a ball portion and a shank portion and an open ended socket member into which the rubber covered ball portion of the stud member is inserted by compressing the rubber about 23 to 30 percent by rubber thickness, i.e. the distance between the metal ball surface and the thickest rubber. The rubberized covering is bonded to the ball portion and has thin sections and a thick section having the shape of a ring or band and preferably a width to thickness ratio of 2.2 to 2.7 and is capable of compression to about 23 to 30% by rubber thickness (29) to give improved steering results and life.

Further illumination and illustration of this invention together with its advantages may be understood by reference to the drawings wherein FIG. 1 is a plan view of the stud with circles added to aid in the description and in the understanding of the invention and its various embodiments;

FIG. 2 is a cross-sectional view of the stud of FIG. 1 showing a rubberized embodiment; and FIG. 3 is a cross-sectional view of FIG. 1 showing another rubberized embodiment.

DESCRIPTION OF PREFERRED EMBODIMENTS

Figure 1:
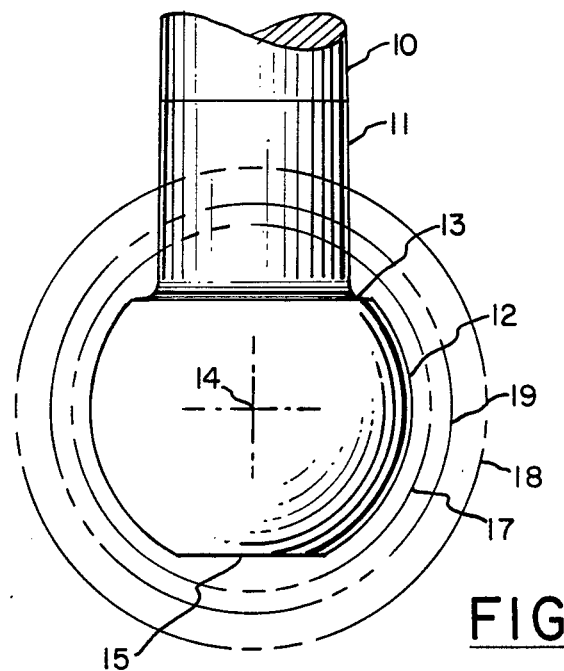

Referring to FIG. 1 a metal stud 10 is shown having a straight wall 11 instead of the sloping walls of some studs that can be used. These straight walls 11 joins the ball surface 12 to form shoulder 13. The center of the ball is designated by numeral 14 and in this embodiment the ball has part of its bottom removed to give a flat surface 15. Flat surface 15 of the ball as is well known can serve as a support surface when positioned operationally in the socket to rest on a load bearing member and also allows for rubber to be thicker at this point where it is so desired.

Since the ball part 15 of the stud may be rubber covered 16, a number of circles viz 17, 18 and 19 are shown in FIG. 1 to indicate respectively radial extent of the thinness covering the thickest covering and on the intermediate covering on the rubberized stud with its gentle slope or curve from the thinness to the thickest sections.

Figure 2:
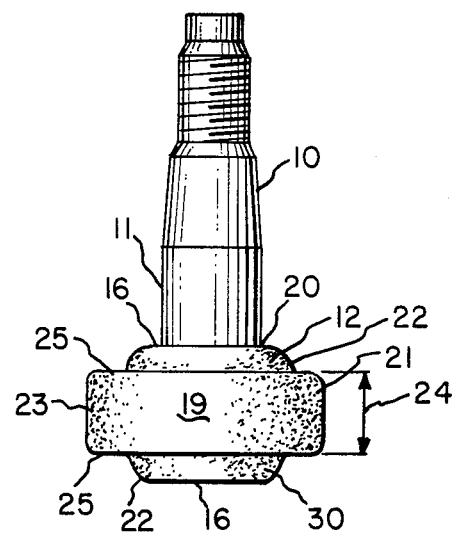

Referring to FIG. 2 these respective circles 17, 18 and 19 can be identified with numerals 20 and 30, the thinner section, numeral 23, the thickest or ring section, and numeral 22, the intermediate circle indicates the curve of rubber surface as it joins the walls of the band. The rubber cover is shown as extending upward over the ball to 20 where it joins the wall 11 of the stud to cover shoulder 13, which is shown in FIG. 1. Also, it is apparent that the rubber on the lower or flat end 15 of the ball covers this flat end of the ball and normally will be the thinnest on the bottom end where the rubber cover 16 extends from the curved to the flat portion of the metal ball as indicated by numeral 30. In some embodiments, it is desirable that the rubber fill the space in FIG. 1 between the flat surface 15 and circle 17. As indicated previously, generally the rubber cover is thinnest in the areas indicated by numerals 20 and 30 and the thickest in the area of band 23 where the width of the band 23 is indicated by numeral 24 and its thickness by numeral 29 best seen in FIG. 3.

Figure 3:
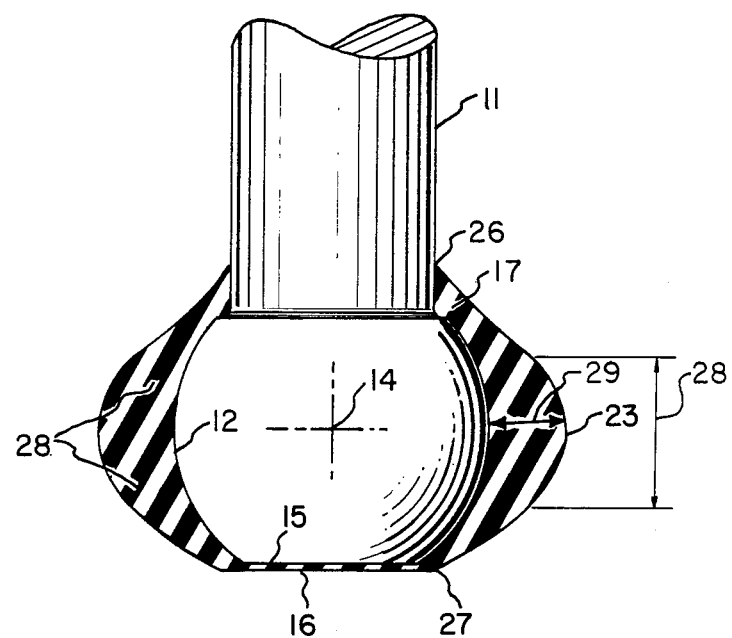

Referring again to FIG. 2 it will be noted that the rubber cover 16 has a curve upward from the thinnest sections 20 and 30 until it contacts the walls 25. On the hand the slope or curve of the rubber surface in FIG. 3 is more in the nature of a change of direction of the slope rather than as shown in FIG. 2. Hence, the width 28 of the band in FIG. 3 would be the distance between the changes in direction of the slope as shown by numeral 28 of FIG. 3. By changing the slope of the cover 16 as shown in FIGS. 2 and 3, it is possible to change the forces exerted within the elastomer. The gentle slope as shown in FIG. 3 where the curve blends into the walls of the band in the range shown by circle 19 and preferably beyond circle 19 as shown in FIG. 3 the forces within the rubberized stud in use are changed more gradually rather than abruptly. This reduces the stresses on the elastomer and increases the functional life of the rubberized ball stud.

Numeral 12 designates the curve or surface of the metal ball and numeral 17 designates the circle of the rubber cover in the thinner parts thereof. Preferably the radius of circle 17 is at least about 0.079 to 0.159 centimeters longer than the radius of the ball circle 12. Thus, in one embodiment, the thinnest rubber sections are preferably about 0.079 to 0.159 centimeters thick. It is preferred that the width to thickness ration of the thickest section viz the band be 2.2 to 2.7, but this ratio may vary from about 2.0 to 3.0 in some cases. The width is indicated by numeral 24 and the thickness is the distance from circle 12 to the outer surface of the thickest section, viz the band as designated by numeral 29. In a preferred embodiment the thickest section is a band of rubber at least about 0.44 to 0.70 centimeters thick.

A rubberized stud in accordance with this invention can be made as follows: A clean standard metal ball stud was treated by dipping or spraying with a commercial metal primer and then an adhesive such as those disclosed in U.S. Pat. No. 4,235,558 was applied. An especially good adhesive is a solvent solution of 1 to 3% of cyanuric acid in ethyl acetate. Then the clean and dry treated standard metal ball stud was covered by transfer molding thereon a sulfur curable black loaded natural rubber to yield a cured natural rubber cover on the ball having a durometer hardness of 60 to 70. A standard stud mold is used for the molding. The transfer molding occurs at preferably a temperature of 120° to 170° C. for about 30 to 45 minutes. The molded rubberized stud is removed from the mold. This invention produces an improved rubber ball socket steering linkage that exhibits improvement in drift reduction, reduction in rotational torque and improvement in fatigue life.

While certain representative embodiments and details have been shown for the purpose of illustrating the invention, it will be apparent to those skilled in this art that various changes and modifications may be made therein without departing from the scope of the invention.

What is claimed is:

1. A rubberized stud member for a vehicle steering assembly including a metallic ball rod having a ball on one end thereof, said ball having a covering of rubber of 60 to 70 durometer hardness with a thickest section and thinnest sections, said thinnest sections of rubber being at least about 0.079 to 0.159 centimeters thick and the thickest section of rubber being a band at least about 0.44 to 0.70 centimeters thick, said band having a width to thickness ratio of about 2.0 to 3.0.

2. The rubberized ball stud of claim 1 wherein a thinnest section occurs adjacent a section of the ball that joins the rod and adjacent a lower section of said ball.

3. The rubberized ball stud of claim 1 wherein the band dimensions are sufficient that the original radius of said band is compressed 23 to 30% rubber thickness in the thickest section when in the assembled condition within its socket.

4. The rubberized ball stud of claim 1 wherein the rubber is a sulfur cured carbon black loaded natural rubber.

5. The rubberized ball stud of claim 2 wherein the rubber is a sulfur cured carbon black loaded natural rubber.

6. The rubberized ball stud of claim 3 wherein the rubber is a sulfur cured carbon black loaded natural rubber.

7. The rubberized ball stud of claim 2 wherein the surface curves gently upward from the thinnest section to meet the wall of the thickest section.

* * * * *